(12) United States Patent
Ghezal et al.

(10) Patent No.: US 11,802,766 B2
(45) Date of Patent: Oct. 31, 2023

(54) METHOD FOR ACQUIRING IMAGES OF A TERRESTRIAL REGION USING A SPACECRAFT

(71) Applicant: AIRBUS DEFENCE AND SPACE SAS, Toulouse (FR)

(72) Inventors: Mehdi Ghezal, Toulouse (FR); Emmanuel Giraud, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 17/909,214

(22) PCT Filed: Mar. 3, 2021

(86) PCT No.: PCT/FR2021/050360
§ 371 (c)(1),
(2) Date: Sep. 2, 2022

(87) PCT Pub. No.: WO2021/176181
PCT Pub. Date: Sep. 10, 2021

(65) Prior Publication Data
US 2023/0086393 A1  Mar. 23, 2023

(30) Foreign Application Priority Data

Mar. 3, 2020  (FR) ..................................... 20 02158

(51) Int. Cl.
*B64G 1/24* (2006.01)
*G01C 11/02* (2006.01)
*H04N 23/68* (2023.01)

(52) U.S. Cl.
CPC ............ *G01C 11/025* (2013.01); *B64G 1/244* (2019.05); *H04N 23/685* (2023.01)

(58) Field of Classification Search
CPC ..... G01C 11/025; B64G 1/244; H04N 23/685
See application file for complete search history.

(56) References Cited

U.S. PATENT DOCUMENTS

| | | | | |
|---|---|---|---|---|
| 4,732,353 A | * | 3/1988 | Studer ...................... | H02K 7/09 244/165 |
| 6,529,267 B1 | * | 3/2003 | Duchon ............... | G01C 11/025 348/145 |

(Continued)

FOREIGN PATENT DOCUMENTS

| | | | | |
|---|---|---|---|---|
| CN | 108613655 A | * | 10/2018 | ............. B64G 1/244 |
| FR | 2 597 985 | | 10/1987 | |

OTHER PUBLICATIONS

Jeffery King et al., "A simple approach for predicting time-optimal slew capability" Dec. 17, 2015, ACTA Astronautica, vol. 120, pp. 159-170 (12 pages).

(Continued)

*Primary Examiner* — Stephen Holwerda
(74) *Attorney, Agent, or Firm* — Nixon & Vanderhye P.C.

(57) ABSTRACT

A method (50) of acquiring images of a terrestrial region Z using a spacecraft (10) in non-geostationary orbit around the Earth (30), the spacecraft includes an observation instrument associated with a ground footprint of length L along the direction of travel, the method includes: a step (51) of observing a portion P1 of the terrestrial region Z, including a step of controlling the attitude of the spacecraft (10) during which the ground footprint is kept stationary during the entirety of the step of observing portion P1, and a step of acquiring an image of portion P1, a step (52) of modifying the pitch attitude of the spacecraft (10) so as to place the ground footprint over a portion P2 of the terrestrial region Z, and a step (53) of observing portion P2 of the terrestrial region.

19 Claims, 6 Drawing Sheets

(56) References Cited

U.S. PATENT DOCUMENTS

| | | | |
|---|---|---|---|
| 8,487,996 B2 | 7/2013 | Mann et al. | |
| 8,880,246 B1* | 11/2014 | Karpenko | B64G 1/288 |
| | | | 701/13 |
| 2004/0111194 A1* | 6/2004 | Wie | B64G 1/244 |
| | | | 701/13 |
| 2007/0129853 A1* | 6/2007 | Greenfeld | G01C 11/02 |
| | | | 701/3 |
| 2012/0293669 A1* | 11/2012 | Mann | H04N 25/71 |
| | | | 348/207.11 |
| 2012/0308084 A1* | 12/2012 | Perrier | G06T 7/20 |
| | | | 382/107 |
| 2016/0355279 A1* | 12/2016 | Lim | B64G 1/286 |
| 2019/0084698 A1 | 3/2019 | Leatham et al. | |
| 2019/0383607 A1 | 12/2019 | Cao et al. | |

OTHER PUBLICATIONS

Translation of International Search Report for PCT/FR2021/050360, dated Jun. 25, 2021 (3 pages).
Written Opinion of the ISA For PCT/FR2021/050360, dated Jun. 25, 2021 (8 pages).

\* cited by examiner

METHOD FOR ACQUIRING IMAGES OF A TERRESTRIAL REGION USING A SPACECRAFT

RELATED APPLICATIONS

This application is the U.S. national phase of International Application No. PCT/FR2021/050360, filed Mar. 3, 2021, which designated the U.S. and claims priority to French Patent Application No. FR 20 02158, filed Mar. 3, 2020, the entire contents of each of which are hereby incorporated by reference.

TECHNICAL FIELD

This invention belongs to the field of terrestrial imaging by spacecraft, such as observation satellites, and relates more particularly to a method of acquiring images of a terrestrial region using a spacecraft in non-geostationary orbit, as well as to a spacecraft for implementing such a method of acquisition.

PRIOR ART

Earth observation missions carried out by a spacecraft consist of acquiring images of portions of the Earth's surface, i.e. taking pictures of it. Such acquisitions are, for example, carried out in response to customer requests, and serve as a basis for the production of final composite images.

Conventionally, such a spacecraft follows a non-geostationary orbit around the Earth in order to carry out acquisitions during its passage over the Earth's surface. To this end, it comprises an observation instrument associated with a predetermined spatial resolution as well as with an optical line of sight. In a known manner, such an optical line of sight forms the outgoing portion of the optical path of the observation instrument, and points in the direction of the Earth's surface.

In addition, the observation instrument is configured so as to present a field of view whose projection on the ground at nadir has a predetermined length according to the spacecraft's direction of travel. The characteristics of this field of view depend, in a manner that is known per se, on the optical elements comprised in the observation instrument and in particular the detectors, as well as on their respective arrangements and positions. It is thus understood that this predetermined length dictates, at least in part, the size of the acquisitions made by the observation instrument along the direction of travel.

When this concerns observing a terrestrial region extending over a distance greater than said predetermined length associated with the observation instrument, several methods of acquisition can be used. Among these, scanning-type methods are often employed. According to a more specific example, pushbroom scanning is utilized in particular.

However, the traveling of the spacecraft has an impact on the ability of the observation instrument to obtain sharp and precise acquisitions. Obtaining acquisitions free of any motion effect (also known as the "motion blur" effect) is indeed problematic, all the more so when the desired resolution is high. One solution to limiting motion blur, at least in theory, consists of reducing the acquisition time, i.e. obtaining fast image captures.

In addition, in order to operate at high frequency, the observation instrument requires complex and therefore expensive electronics. Moreover, a short acquisition time has an unfavorable impact on the signal-to-noise ratio (also called SNR) of the acquisitions. The implementation of TDI type configurations (acronym for the expression "Time Delay and Integration") makes it possible to reduce this deficiency, at the cost of much greater electronic complexity and significant constraints on the attitude control.

Finally, a reduced acquisition time also implies a large amount of information to be processed over a short time horizon. The spacecraft's electronics would therefore have to be sized to read and process this information, which, as the acquisition time decreases, very quickly becomes impossible. It is then necessary to transfer this information to the ground for a post-processing phase, which is constraining due to the high data download rate required in comparison to the available radiofrequency bandwidth, as well as the time needed to obtain the final composite images.

U.S. Pat. No. 8,487,996 uses another scanning technique which allows multiple acquisitions of the same part of the Earth's surface (techniques called "pushframe" in the literature), for example by means of various spectral filters. It is then possible to obtain acquisitions having a satisfactory SNR despite a reduced acquisition time, without necessarily making use of TDI electronics. However, obtaining the final composite images requires the use of enhancement techniques based on information from the acquisitions. This results in complex and time-consuming post-processing operations. Moreover, these scanning techniques are disadvantageous because they also generate large volumes of acquisition data.

DISCLOSURE OF THE INVENTION

The object of this invention is to overcome some or all of the disadvantages of the prior art, in particular those set forth above, by proposing a solution which makes it possible to acquire images of a terrestrial region using a spacecraft in non-geostationary orbit, with excellent image quality, without motion blur, and while maintaining a good capacity for image acquisition.

In addition, this invention aims to allow, in certain embodiments, the acquisition of strips of great length along a direction of travel of the spacecraft and/or aims to limit the complexity of the on-board electronics and/or aims to limit the amount of information exchanged between the spacecraft and a ground station.

To this end, and according to a first aspect, a method is proposed for acquiring images of a terrestrial region Z using a spacecraft in non-geostationary orbit around the Earth along a direction of travel and at a speed of travel relative to the ground $V_{sol}$, said spacecraft comprising an observation instrument associated with a field of view that is fixed within the spacecraft's frame of reference and forming a ground footprint of length L along the direction of travel, and associated with a spatial resolution $R_s$ along the direction of travel. Said method of acquisition comprises:

a step of observing a portion $P_1$ of the terrestrial region Z, comprising a step of controlling the attitude of the spacecraft during a time interval of duration α that is greater than $R_s/V_{sol}$, the attitude of the spacecraft being controlled such that the ground footprint of the field of view is kept stationary for duration α and corresponds to said portion $P_1$, and a step of acquisition by the observation instrument of an image of portion $P_1$ during the time interval of duration α, a step of modifying the pitch attitude of the spacecraft so as to orient the field of view such that the ground footprint corresponds to a portion $P_2$ of the terrestrial region Z, portions $P_1$ and $P_2$ of the terrestrial region Z being contiguous or at most partially overlapping along the direction of travel, a step of observing portion $P_2$ of the terrestrial region Z.

In addition, the step of modifying the pitch attitude is preferably executed during a time interval of duration $\beta$ such that the quantity $V_{sol}\cdot(\alpha+\beta)\cdot 1/L$ is less than a predetermined value R, R being equal to 3 (R=3), or equal to 2.3 (R=2.3), or equal to 2 (R=2).

Thus, the method of acquisition comprises a step of observing a portion $P_1$ of the terrestrial region Z. During this observation step, and for the entire duration $\alpha$ of a time interval, the attitude of the spacecraft is controlled such that the ground footprint of the field of view is kept stationary for the entire duration $\alpha$ and corresponds to said portion $P_1$. Portion $P_1$ is acquired during this time interval.

"Kept stationary" is understood to mean that the attitude setpoint of the spacecraft is determined so as to keep the ground footprint substantially stationary despite the traveling of the spacecraft on its orbit. "Substantially stationary" is understood to mean that the goal of the attitude control is to keep the ground footprint of the field of view stationary, but that this may vary slightly during the duration $\alpha$ of the time interval, due for example to attitude control errors and/or measurement noise. Because of such attitude control, it is understood that the incidence of an optical line of sight of the observation instrument on the Earth's surface varies during duration $\alpha$. For example, if the incidence of the optical line of sight is substantially normal to the Earth's surface at the start of the time interval of duration $\alpha$, then the incidence of said optical line of sight on said Earth's surface will be slightly oblique at the end of the time interval. Thus, the given attitude setpoint is such that the optical line of sight remains pointed towards a fixed point S on the Earth's surface, meaning that travel of the optical line of sight across the ground is stopped, and without rotation of the satellite about said optical line of sight.

Thus, unlike the solutions of the prior art, the footprint of the observation instrument does not move during acquisition of a portion of the terrestrial region Z. There is therefore no motion blur. The duration $\alpha$ is advantageously determined so as to allow acquisition of portion $P_1$ with a sufficient SNR. In particular, the duration $\alpha$ is advantageously greater than $R_s/V_{sol}$, even significantly greater than $R_s/V_{sol}$ (by a factor of 100 or even 1000). Preferably, the acquisition duration of portion $P_1$, included in duration $\alpha$, can also be greater than $R_s/V_{sol}$ or even significantly greater than $R_s/V_{sol}$ (by a factor of 100 or even 1000).

After the step of observing portion $P_1$, the method of acquisition comprises a step of modifying the pitch attitude of the spacecraft, aimed at orienting the field of view in such a way that the ground footprint corresponds to a portion $P_2$ of the terrestrial region Z. Portions $P_1$ and $P_2$ of the terrestrial region Z are for example contiguous, i.e. they touch each other without mutually overlapping, or else said portions $P_1$ and $P_2$ at most partially overlap along the direction of travel. When portions $P_1$ and $P_2$ partially overlap, the overlapping surface area preferably represents less than 10% of the surface area of the ground footprint for the acquisition of portion $P_1$, even less than 5% of said surface area of the ground footprint for the acquisition of said $P_1$. Preferably, portions $P_1$ and $P_2$ lie within the extension of one another, meaning that they are not offset relative to one another transversely to the direction of travel.

In addition, the step of modifying the pitch attitude is preferably carried out during a time interval of duration $\beta$ such that the quantity $V_{sol}\cdot(\alpha+\beta)\cdot 1/L$ is less than a predetermined value R, R being equal to 3 (R=3), or equal to 2.3 (R=2.3), or equal to 2 (R=2). The length L corresponds to the length of the ground footprint along the direction of travel of the spacecraft. For a given circular orbit, the length of the ground footprint varies with the incidence of the optical line of sight on the Earth's surface, and is at its minimum when the incidence is normal to the Earth's surface (nadir-pointing). The length L corresponds to the minimum length of the ground footprint, i.e. the length of the ground footprint at normal incidence (nadir-pointing). However, it is obviously possible to use oblique-pointing during acquisitions and the invention is not limited to the use of nadir-pointing. The length L at normal incidence is considered as the reference length because, if the inequality $V_{sol}\cdot(\alpha+\beta)\cdot 1/L<R$ is satisfied, the inequality $V_{sol}\cdot(\alpha+\beta)\cdot 1/L_{obl}<R$ is also satisfied, $L_{obl}$ being the length of the footprint during oblique-pointing. It should also be noted that the invention is not limited to the use of a circular orbit, and is also applicable to an elliptical orbit. In this case, the reference (minimum) length L corresponds to the length of the ground footprint at normal incidence when the satellite is at the perigee of the elliptical orbit. Furthermore, the speed of travel $V_{sol}$ relative to the ground considered as the reference (maximum) speed of travel relative to the ground corresponds to the speed of travel relative to the ground when the satellite is at the perigee of the elliptical orbit.

Preferably, nadir-pointing is used since it gives the maximum resolution, but there is nothing to prevent oblique-pointing along the direction of travel (upstream or downstream) and/or transversely to said direction of travel (to the left or right). Oblique-pointing may in particular be used to acquire stereo images.

By means of such arrangements, the delay occurring during the observation of portion $P_1$, relative to the travel of the spacecraft and due to immobilization of the ground footprint, is limited and partly compensated for by a relatively fast pitch maneuver. Thus, during a same overflight of the terrestrial region Z, it is possible to acquire several successive portions along the direction of travel of the spacecraft with little delay and therefore to acquire strips of great length along said direction of travel of the spacecraft. For a given orbit and for a predetermined duration $\alpha$, the main parameters ensuring that the quantity $V_{sol}\cdot(\alpha+\beta)\cdot 1/L$ is less than R are the following:

duration $\beta$ of the attitude modification,
length L of the ground footprint.

The quantity $V_{sol}\cdot(\alpha+\beta)\cdot 1/L$ decreases when the duration $\beta$ decreases. To reduce the duration $\beta$, it is possible to increase the ratio $C_t/I_t$ between the capacity $C_t$ for the formation of pitch torque of the spacecraft and the pitch inertia $I_t$ of said spacecraft. Indeed, it is possible to demonstrate that duration $\beta$ satisfies the following expression:

$$\beta \geq \sqrt{\frac{4\cdot I_t \cdot \theta}{C_t}} \qquad \text{[Math. 1]}$$

an expression in which $\theta$ corresponds to the variation in pitch attitude achieved during the step of modifying the pitch attitude.

The quantity $V_{sol}\cdot(\alpha+\beta)\cdot 1/L$ decreases as the length L increases. To increase the length L, it is possible for example to increase the number $N_p$ of acquisition cells (pixels) of the observation instrument along the direction of travel.

To ensure that the quantity $V_{sol}\cdot(\alpha+\beta)\cdot 1/L$ is less than R, the ratio $C_t/I_t$ and the length L (for example the number $N_p$)

will be greater than the ratios $C_t/I_t$ and/or the lengths L that are generally considered in the solutions of the prior art.

After the step of modifying the pitch attitude of the spacecraft, the method of acquisition comprises a step of observing portion $P_2$ of the terrestrial region Z. The step of observing portion $P_2$ is preferably consistent with the step of observing portion $P_1$, meaning that the attitude of the spacecraft can be controlled during a time interval such that the ground footprint is kept stationary over portion $P_2$ for the entire duration of said time interval, and therefore such that the ground footprint does not move during the acquisition of said portion $P_2$. If necessary, the duration of this time interval, which may be equal to duration $\alpha$, is greater than $R_s/V_{sol}$.

Preferably, all the steps of observing portions of the terrestrial region Z are in accordance with the step of observing portion $P_1$. However, in some particular exemplary implementations, nothing excludes considering a method of acquisition in which the observation steps are not all in accordance with the step of observing portion $P_1$.

In some particular embodiments, the method of acquisition may also include one or more of the following features, taken alone or in all technically possible combinations.

In some particular embodiments, the method of acquisition comprises, before the step of observing portion $P_1$:
 a step of observing a portion $P_0$ of the terrestrial region Z, portions $P_0$ and $P_1$ being contiguous or at most partially overlapping transversely to the direction of travel,
 a step of modifying the roll attitude of the spacecraft so as to orient the field of view such that the ground footprint corresponds to portion $P_1$.

Thus, the method of acquisition comprises, before the step of observing portion $P_1$, a step of observing a portion $P_0$ of the terrestrial region Z. Portions $P_0$ and $P_1$ are for example contiguous, i.e. they touch each other without mutually overlapping, or else said portions $P_0$ and $P_1$ at most partially overlap transversely to the direction of travel. When portions $P_0$ and $P_1$ partially overlap, the overlapping surface area preferably represents less than 10% of the surface area of the ground footprint for the acquisition of portion $P_0$, or even less than 5% of said surface area of the ground footprint for the acquisition of said $P_0$. Preferably, portions $P_0$ and $P_1$ lie within the extension of one another, meaning that they are not offset from one another along the direction of travel.

In some particular embodiments, the method of acquisition comprises, after the step of observing portion $P_2$:
 a step of modifying the roll attitude of the spacecraft so as to orient the field of view such that the ground footprint corresponds to a portion $P_3$ of the terrestrial region Z, said portions $P_3$ and $P_2$ being contiguous or at most partially overlapping transversely to the direction of travel, said portions $P_0$ and $P_3$ being contiguous or at most partially overlapping along the direction of travel,
 a step of observing $P_3$ of the terrestrial region Z, In some particular embodiments, the duration $\alpha$ is between 200 ms and 1 s.

In some particular embodiments, the duration $\beta$ is between 1 s and 2 s.

In some particular embodiments, the method of acquisition comprises, during each step of observing a portion of the terrestrial region Z, a tranquilization of the attitude of the spacecraft prior to acquisition of the image of the considered portion.

In some particular embodiments, the tranquilization duration, comprised within duration $\alpha$, is between 100 ms and 800 ms.

In some particular embodiments, the tranquilization duration $\alpha_t$ and the duration $\beta$ are such that $(\alpha_t+\beta) \geq 1.2 \times \sqrt{4 \cdot I_t \cdot \theta / C_t}$.

In some particular embodiments, the terrestrial region Z comprises at least one strip of a length greater than 5 km, obtained by the acquisition of images of at least three portions arranged within the extension of one another along the direction of travel of the spacecraft, the adjacent portions in the direction of travel being contiguous or at most partially overlapping along the direction of travel.

In some particular embodiments, the acquisition of an image is carried out by successively activating acquisition cells or groups of acquisition cells of the observation instrument.

In some particular embodiments, the method of acquiring images comprises, for the duration of the change in pitch attitude and/or in roll attitude of the spacecraft, the carrying out of processing operations on an image acquired during a previous observation step. Indeed, the time required to perform the change in attitude between two successive observation steps can advantageously be used to perform onboard (pre)processing of the acquired images, in particular compression of said acquired images, so that they are ready to be sent to the ground.

In some particular embodiments, the length L is greater than 500 m, or even greater than 2.5 km or 5 km.

According to a second aspect, a spacecraft is proposed for implementing the method of acquisition according to any one of the embodiments of the invention. The spacecraft is intended to be placed in non-geostationary orbit around the Earth in a direction of travel and at a speed of travel relative to the ground $V_{sol}$. Said spacecraft has a pitch inertia $I_t$ and comprises:
 attitude control means having a capacity $C_t$ for the formation of pitch torque,
 an observation instrument associated with a field of view that is fixed within the spacecraft's frame of reference, said observation instrument comprising a number $N_p$ of acquisition cells (pixels) along the direction of travel of the spacecraft.

Furthermore, the number $N_p$ is greater than 1000, and the $C_t/I_t$ ratio is greater than 0.01 s$^{-2}$. Preferably, the number $N_p$ is greater than or equal to 5000, or even greater than or equal to 10,000.

In some particular embodiments, the spacecraft may further comprise one or more of the following features, taken alone or in all technically possible combinations.

In some particular embodiments, the capacity $C_t$ is greater than 0.8 Nm.

In some particular embodiments, the attitude control means comprise at least one reaction wheel which recovers electrical energy.

In some particular embodiments, the attitude control means comprise at least one gyroscopic actuator.

In some particular embodiments, the observation instrument comprises at least two sensor arrays arranged transversely to the direction of travel and spaced apart by a non-zero distance that is less than the width of at least one of said two sensor arrays measured transversely to the direction of travel.

In some particular embodiments, the observation instrument comprises a Bayer filter.

In some particular embodiments, the observation instrument is configured for successively activating acquisition cells or groups of acquisition cells during the acquisition of an image.

PRESENTATION OF FIGURES

The invention will be better understood upon reading the following description given as a non-limiting example, and made with reference to the figures which show.

In these figures, identical references in different figures designate identical or similar elements. For clarity, the items shown are not to scale unless otherwise noted.

DESCRIPTION OF EMBODIMENTS

Figure 1:
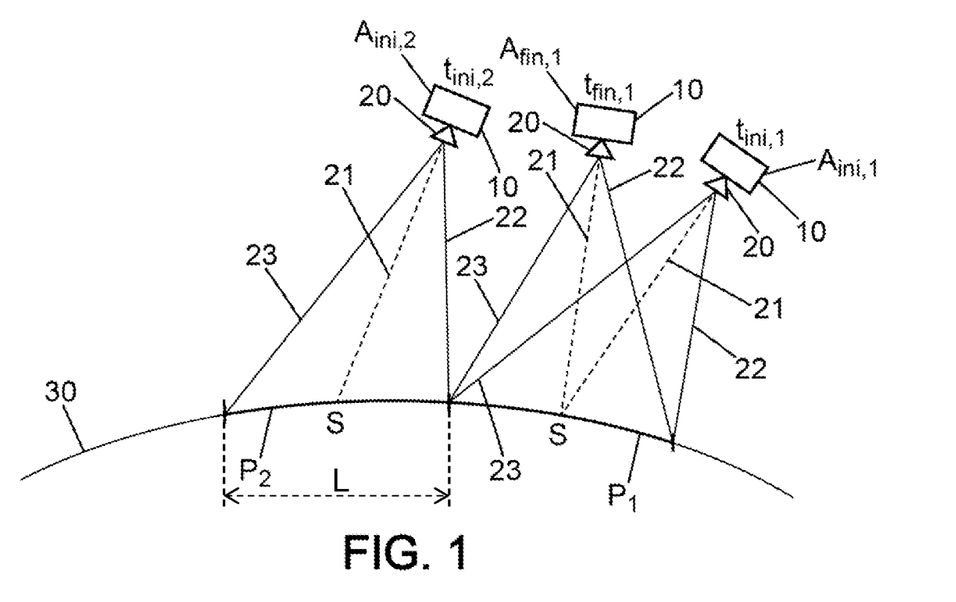
FIG. 1: a schematic representation of a spacecraft in non-geostationary orbit around the Earth.

FIG. 1 schematically represents a spacecraft in non-geostationary orbit around the Earth 30. Preferably, the spacecraft is placed in a circular orbit, at an altitude preferably of less than 2000 km, or even less than 1000 km. However, nothing excludes considering other types of orbits in other examples, in particular elliptical orbits.

In the example illustrated by FIG. 1, the spacecraft is a satellite 10. However, nothing excludes considering other types of spacecraft (space shuttle, probe, etc.) in other examples not detailed here.

Said satellite 10 travels in its circular orbit around the Earth at a speed of travel relative to the ground $V_{sol}$. For example, the satellite 10 travels in a circular orbit at an altitude substantially equal to 500 km at a speed of travel relative to the ground that is substantially equal to 7 km·s$^{-1}$.

The satellite 10 comprises an observation instrument 20 for acquiring images of portions of the surface of the Earth. The combination of these different portions forms a terrestrial region Z that it is the mission of the satellite 10 to image, for example in response to a client request transmitted to said satellite 10 from a ground station. Thus, the images acquired of the different portions are combined to form a final composite image representing the entire terrestrial region Z to be imaged.

"Acquisition" of a portion of the surface of the Earth 30 refers here to the measurement, during a time interval of predetermined duration, of an optical flow received from said portion of the surface of the Earth by said observation instrument 20. It should be noted that, in this description, the expression "image capture" is considered to be equivalent to the term "acquisition".

The observation instrument 20 comprises, in a manner that is known per se, acquisition means configured to capture the optical flow coming from the surface of the Earth 30. Once captured, this radiation is then converted into digital data forming the acquired images, which are stored for transmission to a ground station. Said images can then be subjected to various processing operations known to those skilled in the art, which are outside the scope of this invention.

Said observation instrument 20 is associated with an optical line of sight 21 that is fixed within the satellite's frame of reference. Said optical line of sight 21 forms the outgoing portion of the optical path of the observation instrument 20 and meets the Earth's surface 30 at a point called the "ground point" S. "Fixed within the satellite's frame of reference" refers here to the fact that the optical line of sight 21 follows the movement of the satellite 10 when its attitude is modified, the ground pointing of said optical line of sight 21 being modified accordingly. Thus, if the attitude of the satellite 10 is modified so that the line of sight is continually nadir-pointing, the ground point S of the line of sight then moves on the Earth's surface 30 at a speed identical to the speed of travel relative to the ground $V_{sol}$ of the satellite 10.

Said observation instrument 20 is also associated with a fixed field of view within the satellite's frame of reference. This fixed field of view corresponds to the angular aperture of the observation instrument 20 and of the acquisition cells used at the focal plane. It should also be noted that "fixed" refers here to the fact that the optical line of sight 21 is fixed within the satellite's frame of reference, and moreover that the angular aperture is of invariable size. The field of view of the observation instrument 20 forms a ground footprint of length L along the direction of travel. As indicated above, the length of the ground footprint can vary with the incidence of the optical line of sight 21 on the surface of the Earth 30, and the length L corresponds to the minimum length of said ground footprint which is obtained with nadir-pointing of said optical line of sight 21. This length L obtained with nadir-pointing is considered as a (minimum) reference length for the ground footprint. However, the image acquisitions are not necessarily carried out with nadir-pointing and may be carried out with any pointing.

In addition, the observation instrument 20 is associated with a predetermined spatial resolution $R_s$. Conventionally, the spatial resolution corresponds to the size, for example in meters, of the smallest object which can be detected in a scene represented by an image resulting from an acquisition carried out by the observation instrument 20. Therefore, the smaller the size of the smallest detectable object, the greater the spatial resolution. For example, if the spatial resolution is equal to 0.5 meters (m), then the smallest surface feature of the Earth 30 that a pixel of the sensor can represent is an area of 0.25 m$^2$. Nothing excludes considering other values of spatial resolution. Preferably, the spatial resolution $R_s$ is less than two meters (2 m), or even less than one meter (1 m). As with the length L, the spatial resolution can vary with the incidence of the optical line of sight 21 on the surface of the Earth 30. The spatial resolution $R_s$ here corresponds to the spatial resolution of the observation instrument 20 obtained with nadir-pointing (and at the perigee of the orbit in the case of an elliptical orbit). The spatial resolution $R_s$ is less than the length L and is preferably significantly less than said length L, for example by a factor of at least 5000, or even at least 10,000.

In the remainder of the description, it is considered that the terrestrial region Z to be acquired is of size T along the direction of travel. It is then understood that the terrestrial region Z refers to a continuous curved surface (due to the sphericity of the Earth), meaning as a single piece along the direction of travel. In other words, this description does not relate to the case where the terrestrial region Z is a combination of disjoint terrestrial sub-areas along the direction of travel. However, it should be noted that there is nothing to prevent considering the acquisition of a terrestrial region which meets these characteristics, for example by repeated application of the method of acquisition to each of the disjoint sub-areas then composing said terrestrial region.

It is also considered that, along the direction of travel, the length L of the ground footprint is less than said size T. Such arrangements imply that several acquisitions (at least two) are necessary for the terrestrial region Z to be entirely acquired, since the ground footprint does not allow acquiring an image representing the entire terrestrial region Z. The terrestrial region Z is necessarily the combination of at least two different portions, represented by at least two images.

In the remainder of the description, $P_i$ designates, i being a positive integer or zero, a portion of the terrestrial region Z to be acquired by the observation instrument 20. Also adopted is the rule that if j is strictly greater than i, then portion $P_j$ is acquired by the observation instrument 20 after portion $P_i$.

Figure 2:
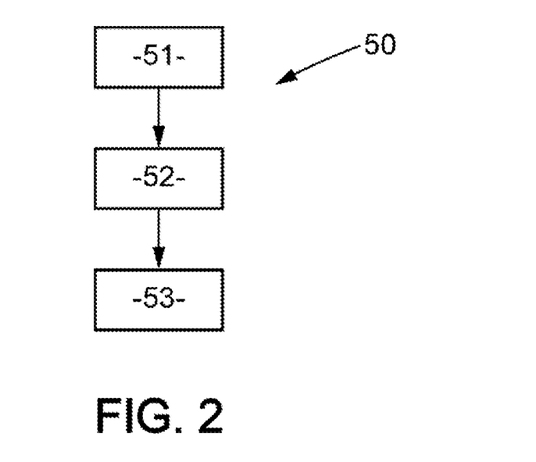
FIG. 2: a diagram illustrating the main steps of one embodiment of a method of acquisition.

FIG. 2 schematically represents the main steps of a method 50 of acquisition, in the case of an acquisition of images of two portions $P_1$ and $P_2$ of the terrestrial region Z, portion $P_2$ being geographically located downstream from said portion $P_1$ along the direction of travel.

As illustrated by FIG. 2, the method 50 of acquisition firstly comprises a step 51 of observing portion $P_1$ of the terrestrial region Z. Said observation step is executed during a time interval of duration α which is greater than $R_s/V_{sol}$ (preferably significantly greater, by a factor of at least 100 or even at least 1000), and comprises a step of controlling the attitude of the satellite 10 during said duration α. During the step of attitude control, the attitude of the satellite 10 is controlled so that the ground footprint of the field of view is kept stationary for the entire duration α and corresponds to said portion $P_1$. The step 51 of observing portion $P_1$ also includes a step of acquiring an image of portion $P_1$ using the observation instrument 20, which is executed during the time interval of duration α. In other words, the step of attitude control is executed for the entire duration α, and the acquisition step is executed during the time interval of duration α, the duration $α_a$ of the acquisition step being less than or equal to duration α.

The method 50 of acquisition then includes a step 52 of modifying the pitch attitude of the satellite 10 so as to orient the field of view in such a way that the ground footprint corresponds to portion $P_2$ of the terrestrial region Z. Portions $P_1$ and $P_2$ of the terrestrial region Z are contiguous along the direction of travel or they at most partially overlap along said direction of travel. The step of modifying the pitch attitude 52 is executed during a time interval of duration β such that the quantity $V_{sol}·(α+β)·1/L$ is less than a predetermined value R, R being equal to 3 (R=3), or equal to 2.3 (R=2.3), or equal to 2 (R=2).

As illustrated by FIG. 2, the method 50 of acquisition then comprises a step 53 of observing portion $P_2$ of the terrestrial region Z.

FIG. 1 schematically represents the satellite 10 in the process of acquiring portions $P_1$ and $P_2$ of the terrestrial region Z, and corresponds to a simplified two-dimensional view resulting from the intersection between the Earth and a plane of the orbit of said satellite 10.

The example of FIG. 1 is in no way limiting, provided in order to illustrate the operation of the method 50 of acquisition of FIG. 2. In this example, portions $P_1$ and $P_2$ are contiguous, meaning that they touch each other without overlapping each other. However, nothing excludes having a partial overlap between said portions $P_1$ and $P_2$ in other examples. Where applicable, the overlapping surface area preferably represents less than 10% of the surface area of the ground footprint for the acquisition of portion $P_1$, or even less than 5% of said surface area of the ground footprint for the acquisition of said portion $P_1$.

The fixed field of view of the observation instrument 20 is represented in FIG. 1 by a cone delimited by two sides 22, 23 originating from said satellite 10. At each moment, these two sides 22, 23 delimit a ground footprint on the surface of the Earth 30, its length on the ground being substantially equal to L.

As for the optical line of sight 21, it is represented in FIG. 1 by means of a dashed line originating from the satellite 10 and intersecting the surface of the Earth 30 at a ground point S.

As indicated above, during the step 51 of observing portion $P_1$, the attitude of the satellite 10 is controlled so that the ground footprint is kept stationary for the entirety of duration α, which is greater than $R_s/V_{sol}$.

It should be noted that, as the satellite 10 follows a non-geostationary orbit and the optical line of sight 21 is fixed within the satellite frame of reference, the ground footprint, except in cases of specific attitude control, in principle should travel with the satellite 10. The attitude control carried out during the step 51 of observing portion $P_1$ aims in particular to prevent movement of the ground footprint.

The example of FIG. 1 allows illustrating the operation of the attitude control carried out during the step 51 of observing portion $P_1$. In the example illustrated by FIG. 1, the satellite 10 is represented three times in its orbit:
  a first representation in attitude $A_{ini,1}$, at the start of the step 51 of observing portion $P_1$, i.e. at the start of the time interval of duration α at time $t_{ini,1}$,
  a second representation in attitude $A_{fin,1}$, at the end of the step 51 of observing portion $P_1$, i.e. at the end of the time interval of duration α at time $t_{fin,1}$ ($t_{fin,1}=t_{ini,1}+α$),
  a third representation in an attitude denoted $A_{ini,2}$, at the start of the step 53 of observing portion $P_2$, at a time $t_{ini,2}$ ($t_{ini,2}=t_{fin,1}+β$).

In attitude $A_{ini,1}$, the optical line of sight 21 is oriented so that the associated ground point S corresponds to the positioning of portion $P_1$ as described above. As illustrated by FIG. 1, attitude $A_{fin,1}$ is different in pitch from attitude $A_{ini,1}$. Note, however, that although the respective directions of the optical line of sight 21 differ depending on whether the attitude of the satellite 10 corresponds to $A_{ini,1}$ or to $A_{fin,1}$, the ground point S itself has not moved during the time interval of duration α (between time $t_{ini,1}$ and time $t_{fin,1}$), due to the attitude control which keeps the ground footprint stationary for the duration of the step 51 of observing portion $P_1$.

Such arrangements are particularly advantageous. Indeed, the fact that the ground footprint remains stationary during duration α makes it possible to avoid any motion blur. Moreover, if the duration $α_a$ of the acquisition is also greater than $R_s/V_{sol}$, then this makes it possible to carry out an acquisition having a good signal-to-noise ratio. For example, the ratio $R_s/V_{sol}$ is substantially equal to 70 microseconds (µs). Preferably, duration α is between 200 milliseconds (ms) and 1 second (s). Duration $α_a$ is less than or equal to duration α, for example less than 200 ms. It should be noted that known scanning-type acquisition techniques do not allow avoiding motion blur for an acquisition duration $α_a$ such as the one implemented during the step 51 of observing portion $P_1$.

If the attitude of the satellite 10 has not been modified at the end of the step 51 of observing portion $P_1$, the direction of the optical line of sight 21 would remain substantially parallel to the direction presented at the end of the acquisition of said portion $P_1$. However, retaining this last direction of the optical line of sight 21 would delay the acquisition of portion $P_2$, because it would then be necessary to wait for the satellite 10 to move sufficiently in its orbit for the ground footprint to correspond to said portion $P_2$.

The step 52 of modifying the pitch attitude of the satellite 10 is specifically intended to orient the satellite 10 immediately after having completed the step 51 of observing portion $P_1$, so that the ground footprint corresponds to said portion $P_2$. In addition, the step 52 of modifying the pitch attitude is executed during a time interval of duration β, consecutive to the time interval of duration α, such that the quantity $V_{sol} \cdot (α+β) \cdot 1/L$ is less than R.

The targeted goal in the step 52 of modifying the pitch attitude is therefore to place the ground footprint on portion $P_2$ as quickly as possible, in order to be able to begin observation of said portion $P_2$ as soon as possible. This change in attitude should preferably be carried out sufficiently quickly to partially compensate for the time spent observing portion $P_1$, and therefore not compromise the implementation of the observation mission. "Compromise the implementation of the observation mission" refers here to being unable to carry out as many acquisitions as desired, and therefore ultimately being unable to image the terrestrial region Z in its entirety.

For the rest of the description, the concept of relative delay is introduced as being the ratio between the distance, relative to the ground, traveled by the satellite 10 between the start of observation of portion $P_1$ and the start of observation of portion $P_2$, and the length L. One will note that said relative delay corresponds specifically to the quantity $V_{sol} \cdot (α+β) \cdot 1/L$. Consequently, the concept of relative delay aims to quantify a delay of the satellite 10 in its orbit by taking into account not only the observation duration α but also the duration β necessary for the pointing modification maneuvers. Equivalently, the concept of relative delay makes it possible to quantify the working portion of the mission devoted to the observation of portion $P_1$ in comparison to the non-working portion of the mission, before the start of observation of portion $P_2$, devoted to the maneuvers necessary to modify the attitude of the satellite 10 with a view to the imminent acquisition of said portion $P_2$.

It is then understood that a relative delay value strictly greater than 1 indicates that the satellite 10 is falling behind in the total time required to execute the steps 51 of observing portion $P_1$ and 52 of modifying the pitch attitude. Such a delay is for example linked to the fact that once the step 51 of observing portion $P_1$ has been executed for a sufficiently long duration α, the duration β of the modification of the pitch attitude during step 52 is not short enough to compensate for the time devoted to the step 51 of observing portion $P_1$. In the present case, the relative delay is less than R. Although this value is greater than 1, it is sufficiently low that this does not compromise the observation mission, since it is nevertheless possible to acquire several successive portions along the direction of travel. In the case where it is desired to acquire a terrestrial region Z comprising at least one strip of very long length, typically on the order of several hundred kilometers, the quantity $V_{sol} \cdot (α+β) \cdot 1/L$ is for example less than 2.3, or even less than 2.

The step 53 of observing portion $P_2$ is preferably executed immediately after the step 52 of modifying the pitch attitude. As indicated above, the step 53 of observing portion $P_2$ is for example consistent with the step 51 of observing portion $P_1$, meaning that the attitude of the satellite 10 is controlled during a time interval such that the ground footprint is kept stationary over portion $P_2$ for the entire duration of said time interval. The duration of this time interval, during which the step 53 of observing portion $P_2$ is executed, may be equal to duration α. However, for the observation of different portions $P_i$, nothing excludes considering respective durations $α_i$ which are not all identical. Where appropriate, the duration α used in the quantity $V_{sol} \cdot (α+β) \cdot 1/L$ corresponds to a reference duration, which may be equal to the maximum value of the durations $α_i$.

More generally, the terrestrial region Z may be composed of a number N of portions $P_i$ to be acquired, N being greater than or equal to two. Thus, the method 50 of acquisition comprises N observation steps which may for example all be consistent with the step 51 of observing portion $P_i$ described above. If all the portions $P_i$ are arranged so that, regardless of the value of i, portion $P_{i+1}$ is always located downstream of portion $P_i$ along the direction of travel, then the method 50 of acquisition may comprise (N−1) steps of modifying the pitch attitude in order to advance the ground footprint of portion $P_i$ to the following portion $P_{i+1}$. It is possible to consider the same duration β for all steps of modifying the pitch attitude. However, nothing excludes considering respective durations $β_i$ which are not all identical. Where appropriate, the duration β used in the quantity $V_{sol} \cdot (α+β) \cdot 1/L$ corresponds to a reference duration, which may be equal to the duration necessary to apply the maximum variation in pitch attitude $θ_{max}$ to move the ground footprint from one portion $P_i$ to the next portion $P_{i+1}$. For example, duration β is between 1 s and 2 s.

Figure 3A:
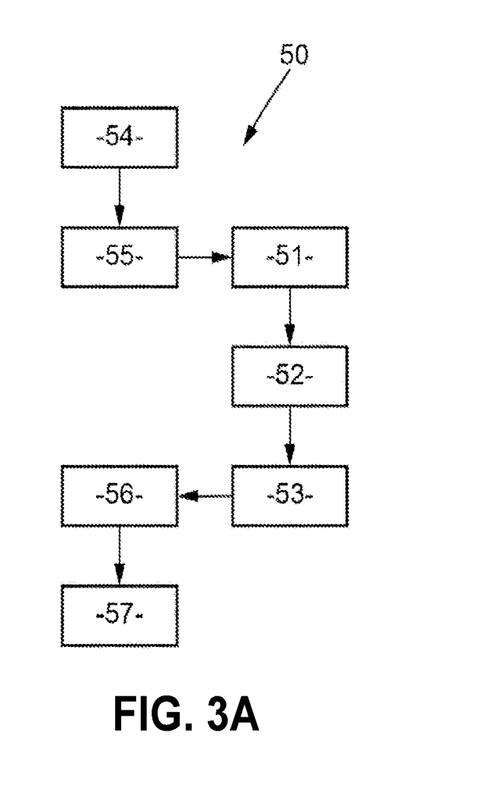
FIG. 3A is a diagram illustrating the main steps of another embodiment of a method of acquisition.

FIG. 3A schematically represents a particular embodiment of the method 50 of acquisition, in the case of an acquisition of images of four portions P0 to P3 of the terrestrial region Z, said portions P0 to P3 being arranged such that portion Pi+1 is not necessarily located geographically downstream from portion Pi along the direction of travel. More particularly, FIG. 3A schematically represents the main steps of this particular embodiment, while FIG. 3B schematically represents the arrangement of portions P0 to P3.

Figure 3B:
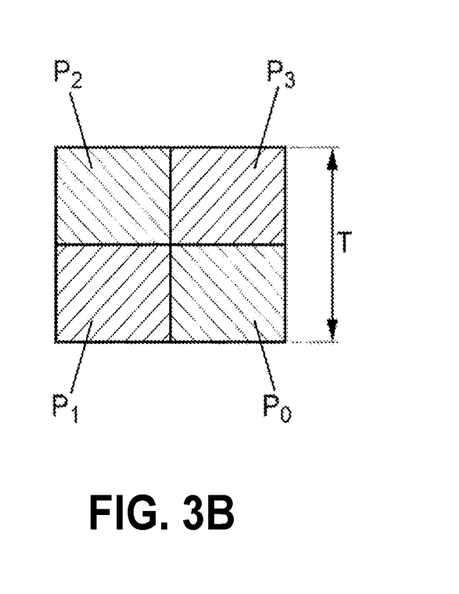
FIG. 3B is a schematic representation of an arrangement of portions $P_0$ to $P_3$.

For the observation of portion $P_0$, the method 50 of acquisition comprises:
- a step 54 of observing portion $P_0$ of the terrestrial region Z, portions $P_0$ and $P_1$ being contiguous or at most partially overlapping transversely to the direction of travel (see part b) of FIG. 3),
- a step 55 of modifying the roll attitude of the satellite 10 so as to orient the field of view such that the ground footprint corresponds to portion $P_1$.

The method 50 of acquisition then resumes the steps 51 of observing, 52 of modifying the pitch attitude, and 53 of observing, all described with reference to FIG. 2, which are applied to portions $P_1$ and $P_2$ of the terrestrial region Z which are contiguous or at most partially overlapping along the direction of travel.

For the observation of portion $P_3$, the method 50 of acquisition comprises, after the step 53 of observing portion $P_2$:

a step 56 of modifying the roll attitude of the satellite 10 so as to orient the field of view such that the ground footprint corresponds to a portion $P_3$ of the terrestrial region Z, said portions $P_3$ and $P_2$ being contiguous or at most partially overlapping transversely to the direction of travel, said portions $P_0$ and $P_3$ being contiguous or at most partially overlapping along the direction of travel (see part b) of FIG. 3), a step 57 of observing $P_3$ of the terrestrial region Z.

FIGS. 4A, 4B, 4C and 4D schematically represent examples of possible geographical distributions of portions P1 to PN to be acquired inside a terrestrial region Z.

Figure 4A:
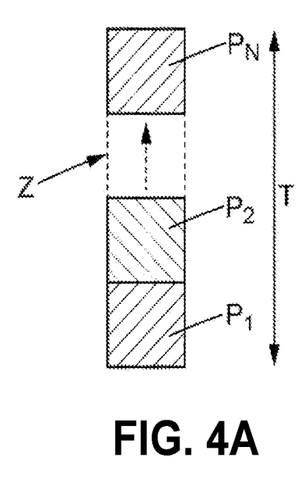
FIGS. 4A, 4B, 4C are 4D are schematic representations of examples of successive acquisitions of portions of a terrestrial region.

FIG. 4A schematically represents an example in which the portions Pi are arranged such that, regardless of the value of i, portion Pi+1 is always located downstream of portion Pi along the direction of travel. In this non-limiting example, portion Pi+1 is contiguous with portion Pi regardless of the value of i, and is also arranged within the extension of said portion Pi. As indicated above, it is also possible to provide a partial overlap between portions Pi+1 and Pi, for example an overlap of less than 10% or even less than 5%. Such overlapping makes it possible in particular to facilitate the readjustment of the various images relative to one another. "Readjustment" refers here to the coordinated alignment of said portions Pi and Pi+1 during reconstruction of the composite image of the terrestrial region Z. The image processing techniques employed for implementing such a readjustment of two images are known to those skilled in the art.

Figure 4B:
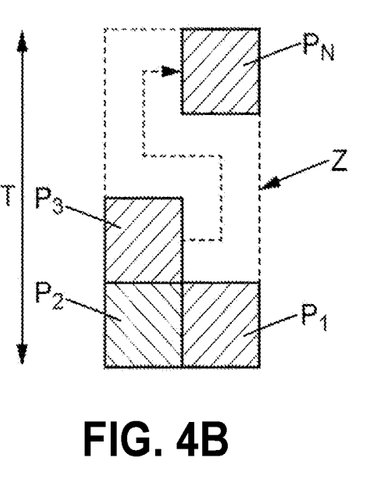

FIG. 4B schematically represents an example in which portion Pi+1 is not necessarily located geographically downstream from portion Pi along the direction of travel, and in which the portions Pi are acquired by implementing the method 50 of acquisition illustrated by FIG. 3A. In this non-limiting example, portion P2 is contiguous with portion P1 transversely to the direction of travel, and is also arranged within the extension of said portion P1. Portion P3 is contiguous with portion P2 along the direction of travel, and is also arranged within the extension of said portion P2. Portion P4 is contiguous with portion P3 transversely to the direction of travel, and is also arranged within the extension of said portion P1. Portion P4 is also contiguous with portion P1 along the direction of travel, and is further arranged within the extension of said portion P1. As indicated above, it is also possible to provide a partial overlap between portions Pi+1 and Pi.

Figure 4C:
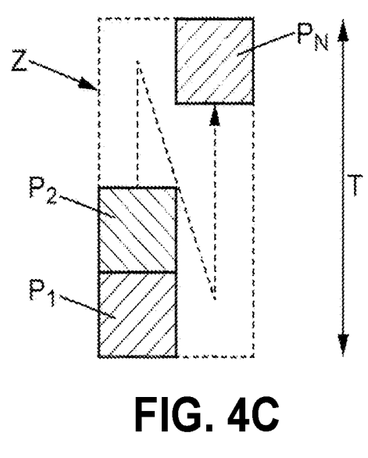
Figure 4D:
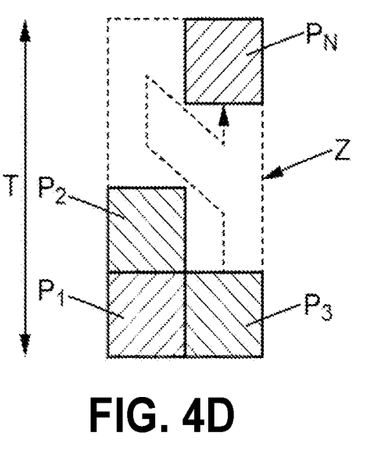

FIGS. 4C and 4D schematically represent other examples of possible geographical distributions of the portions P1 to PN to be acquired inside the terrestrial region Z, where portion Pi+1 is not necessarily located geographically downstream of portion Pi along the direction of travel.

In preferred embodiments, each observation step which follows a step of modifying the pitch attitude comprises a tranquilization of the attitude of the satellite 10 prior to acquisition of the image of the considered portion.

Indeed, modifying the pitch attitude of the satellite 10, which is preferably executed very quickly, is likely to create residual vibrations of said satellite 10, and consequently also of the optical line of sight 21 of the observation instrument 20. In addition, the measurements or estimates of the attitude of the satellite 10, immediately after a step of modifying the pitch attitude, can be very noisy. Therefore, in such a case it is not possible to acquire the image of the considered portion at the very beginning of the step of observing this portion, and prior tranquilization of the attitude of the satellite 10 is advisable before performing the acquisition. The tranquilization duration, included in duration $\alpha$ similarly to and preceding acquisition duration $\alpha_a$, is for example between 100 ms and 800 ms. Preferably, the tranquilization duration $\alpha_t$ (included in duration $\alpha$) and the duration $\beta$ are such that $(\alpha_t+\beta) \geq 1.2 \times \sqrt{4 \cdot I_r \cdot \theta / C_r}$. It should be noted that it is also possible to provide such tranquilization of the attitude during the observation steps which follow the steps of modifying the roll attitude.

Figure 5:
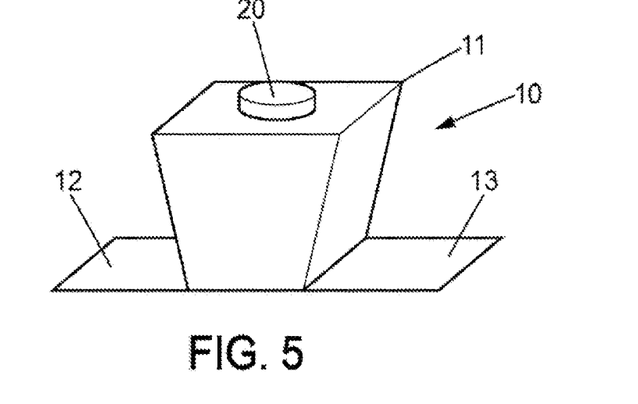
FIG. 5: a schematic representation of a satellite for implementing a method of acquisition.

FIG. 5 schematically represents an embodiment of a satellite 10 for the implementation of the method 50 of acquisition.

As illustrated by FIG. 5, the satellite 10 comprises two solar generators 12, 13 arranged on respective opposite faces of a body 11 of said satellite 10. The observation instrument 20 is arranged on a face connecting said faces bearing the solar generators 12, 13.

The satellite 10 also comprises attitude control means (not shown in the figures), such as inertial actuators. Said attitude control means have a capacity $C_t$ for the formation of pitch torque. In other words, $C_t$ corresponds to the maximum value that a pitch torque formed by the attitude control means of the satellite 10 can take.

In addition, the pitch inertia of the satellite 10 is designated $I_r$.

The satellite 10 further comprises a processing circuit (not shown in the figures), which controls the operation of the observation instrument 20 and of the attitude control means.

The processing circuit comprises for example one or more processors and storage means (magnetic hard disk, electronic memory, optical disk, etc.) in which is stored a computer program product, in the form of a set of program code instructions to be executed in order to implement the various steps of the method 50 of acquisition. Additionally or alternatively, the processing circuit comprises one or more programmable logic circuits (FPGA, PLD, etc.), and/or one or more dedicated integrated circuits (ASIC, etc.), and/or a set of discrete electronic components, etc., adapted to perform all or part of said steps of the method 50 of acquisition.

In other words, the processing circuit corresponds to means configured in software (specific computer program product) and/or hardware (FPGA, PLD, ASIC, discrete electronic components, etc.) to perform all or part of the steps of the method 50 of acquisition, by suitable control of the observation instrument 20 and attitude control means.

It should be noted that the satellite 10 may also comprise, in a conventional manner, other elements such as sensors (star sensor, gyroscopes, etc.), which can also be connected to the processing circuit and which fall outside the scope of this invention.

As indicated above, for a given circular (or elliptical) orbit and for a predetermined duration $\alpha$ that is sufficiently long for an image capture of sufficient quality in terms of acquisition duration $\alpha_a$ (SNR) and tranquilization duration, the main parameters which allow ensuring that the quantity $V_{sol} \cdot (\alpha+\beta) \cdot 1/L$ is less than R are primarily the length L of the ground footprint and the ratio $C_t/I_r$. In particular, the quantity $V_{sol} \cdot (\alpha+\beta) \cdot 1/L$ decreases when the ratio $C_t/I_r$ increases and/or when the length L increases.

If we consider that the observation instrument 20 comprises $N_p$ acquisition cells (pixels) along the direction of travel, then the number $N_p$ is advantageously greater than 1000, or even greater than 5000 or 10,000. If we consider a spatial resolution $R_s$ on the order of 0.5 m, then this corresponds to a length L greater than 500 m, or even greater than 2.5 km or 5 km.

Furthermore, the ratio $C_t/I_t$ is advantageously greater than 0.01 s$^{-2}$, or even greater than 0.018 s$^{-2}$. For example, the capacity $C_t$ for the formation of pitch torque is greater than 0.8 Newton-meters (N·m) and the pitch inertia $I_t$ is less than 80 kg·m$^2$. In preferred embodiments, the capacity $C_t$ for the formation of pitch torque is greater than 1 N·m and the pitch inertia $I_t$ is less than 60 kg·m$^2$.

By means of such arrangements, namely a satellite 10 having a high $C_t/I_t$ ratio and an observation instrument 20 having a long footprint of length L, it is possible to have image acquisition durations $\alpha_s$ that are sufficiently large for the quality of the captured image, while compensating for the imposed delay by rapid maneuvers between successive observations. In particular, it is possible to acquire a terrestrial region Z comprising at least one strip of a length greater than 10 km, or even greater than 100 km, obtained by the acquisition of images of at least 3 portions or even many more, arranged within the extension of one another along the direction of travel of the spacecraft.

In preferred embodiments, the attitude control means comprise at least one reaction wheel which recovers electrical energy. Preferably, all the inertial actuators utilized during the step 52 of modifying the pitch attitude are reaction wheels which recover electrical energy. Such reaction wheels which recover electrical energy are for example known from patent application EP 2247505 A1.

The use of reaction wheels which recover electrical energy is particularly advantageous for the following reasons. First of all, it should be noted that in order to provide a high capacity for pitch torque (greater than 0.8 N·m or even greater than 1 N·m) by means of reaction wheels, it is necessary to use quite massive reaction wheels, which tends to increase the pitch inertia $I_t$ of the satellite 10. However, with reaction wheels which recover electrical energy, in particular those described in patent application EP 2247505 A1, it is possible to reduce the mass required, at equivalent torque capacity, compared to reaction wheels which do not recover electrical energy. In addition, because the reaction wheels recover electrical energy, the electrical energy requirements of the satellite 10 are reduced. It is possible in particular to reduce the dimensions and the mass of the solar generators 12, 13, which makes it possible to reduce the pitch inertia $I_t$ of the satellite 10. Thus, the increase in mass which may be necessary in order to have significant capacity for pitch torque (although less with reaction wheels which recover electrical energy than with reaction wheels which do not) can be at least partially compensated for by a corresponding reduction in the mass and dimensions of the solar generators 12, 13.

In some particular embodiments, the attitude control means comprise at least one gyroscopic actuator, known as a control moment gyroscope (or CMG) in the literature. Preferably, all the inertial actuators utilized during the step 52 of modifying the pitch attitude are gyroscopic actuators. However, it is possible to combine different types of inertial actuators, such as gyroscopic actuators and reaction wheels.

The use of gyroscopic actuators is particularly advantageous because they have a high ratio of torque capacity/mass). It is thus possible to have a high capacity for pitch torque without adversely impacting the pitch inertia $I_t$ of the satellite 10.

As indicated above, the observation instrument 20 comprises acquisition means. In preferred embodiments, the acquisition means of the observation instrument 20 comprise at least one sensor array. The sensor array is for example of the CMOS type (acronym for "Complementary Metal-Oxide-Semiconductor"). It should be noted that the observation instrument 20 may comprise several sensor arrays.

For example, several sensor arrays may be utilized to acquire images in different respective wavelengths (red, green, blue, near infrared, etc.).

Figure 6:
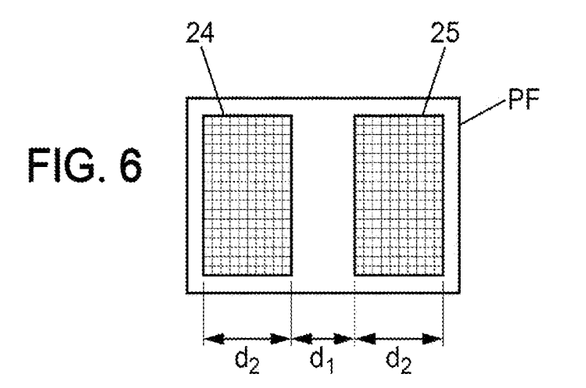
FIG. 6: a schematic representation of an exemplary implementation of acquisition means of an observation instrument.
Figure 7:
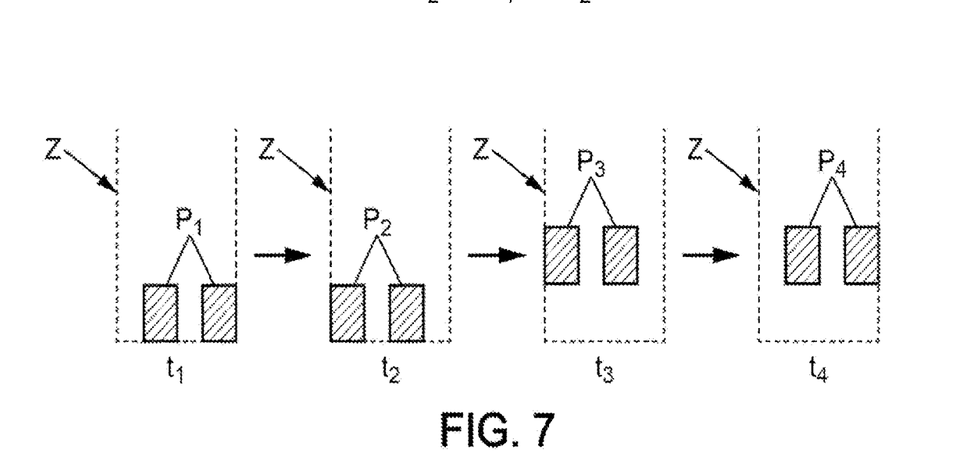
FIG. 7: a schematic representation of examples of successive acquisitions of portions of a terrestrial region by the acquisition means of FIG. 6.

According to another example, several sensor arrays may be utilized in order to increase the dimensions of the ground footprint of the observation instrument 20 while limiting the complexity of the sensor arrays. FIG. 6 schematically represents a preferred embodiment of the acquisition means of the observation instrument 20, in which said acquisition means comprise, at the focal plane PF, at least two sensor arrays 24, 25 arranged transversely to the direction of travel and spaced apart by a non-zero distance $d_1$ that is less than the width of at least one of said two sensor arrays 24, 25 measured transversely to the direction of travel. In the example illustrated by FIG. 6, the two sensor arrays 24, 25 have the same width $d_2$ and may be identical. Such arrangements are particularly advantageous when implementing the method 50 of acquisition of FIG. 3, because it is then possible to carry out the acquisition of a wide terrestrial region while reducing the variations in roll attitude required in order to acquire portions that are adjacent transversely to the direction of travel of the satellite 10. FIG. 7 schematically represents the ground footprint of the observation instrument 20 of FIG. 6, at successive instants $t_1$, $t_2$, $t_3$ and $t_4$ during the acquisition of portions $P_1$, $P_2$, $P_3$ and $P_4$ of a terrestrial region Z. In the example illustrated by FIG. 6, each of the portions $P_1$, $P_2$, $P_3$ and $P_4$ is composed of two separate sub-parts.

In preferred embodiments, the observation instrument 20 comprises a Bayer filter. A Bayer filter, in a manner that is known per se, allows capturing color images in different respective wavelengths of red, green, and blue (RGB), with the same sensor array. Such arrangements allow simplifying the observation instrument 20.

Figure 8A:
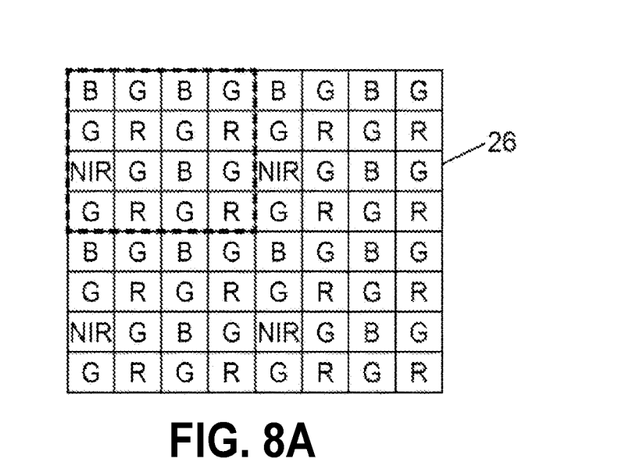
FIG. 8A is a schematic representation of a sensor array implementing a modified Bayer filter, and FIG. 8B charts spectral responses of filters.
Figure 8B:
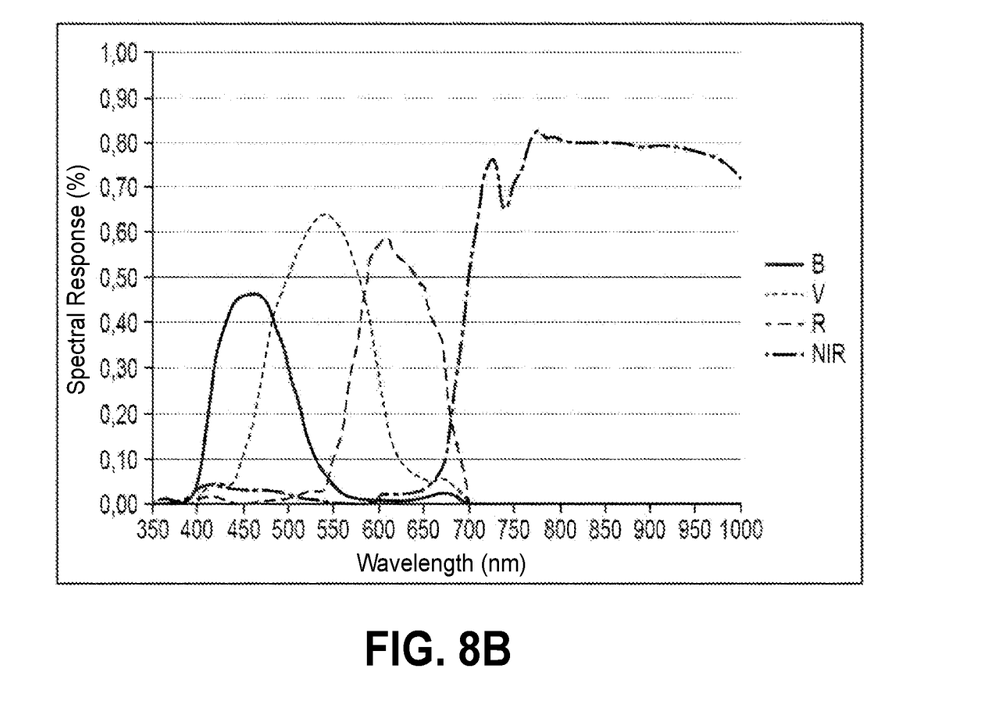

In some embodiments, it is possible to modify the Bayer filter to include the near infrared. An example of such a modified filter is schematically presented in FIGS. 8A and 8B. More particularly, FIG. 8A represents a sensor array 26 comprising several sets of acquisition cells, respectively sensitive in the red (designated R in FIG. 8), green (G), blue (B), and near infrared (NIR) wavelengths. In this example, the sensor array 26 comprises 16×16 acquisition cells, and can be extended to a larger number of acquisition cells by repeating for example the pattern of 4×4 acquisition cells located in the upper left part (surrounded by a dotted line). FIG. 8B represents the spectral responses of the various filters respectively associated with the red (R), green (G), blue (B), and near infrared (NIR) wavelengths. It is also possible, according to other examples, to have several focal planes, including one focal plane with a sensor array and a conventional Bayer filter (forming a Bayer array) and another focal plane with at least one other sensor array and another filter, for example near infrared. Finally, nothing prevents splitting the focal plane into respective filters suitable for a particular mission or using a single focal plane without a filter.

In preferred embodiments, the observation instrument 20 is configured to activate acquisition cells successively during the acquisition of an image. Such an acquisition mode is known as "rolling shutter acquisition mode" in the literature. Such arrangements, particularly suitable for very large sensor arrays, allow reducing the amount of data that must be processed simultaneously by the observation instrument 20, since the acquisition cells are not all activated simultaneously. Indeed, different acquisition cells or groups of different acquisition cells are activated successively. Although this increases the time required to perform the complete acquisition of each portion, in the present case it is possible due in particular to the rapid pitch maneuvers, which allow compensating for the delay imposed during the acquisitions.

In addition to the acquisition means, the observation instrument 20 may comprise other elements, for example such as optics comprising one or more mirrors, one or more lenses, a support structure, electronic components, etc.

In preferred embodiments, the optics are of the Korsch type, which makes it possible to be both highly compact and of low mass, with a high focal length.

Figure 9:
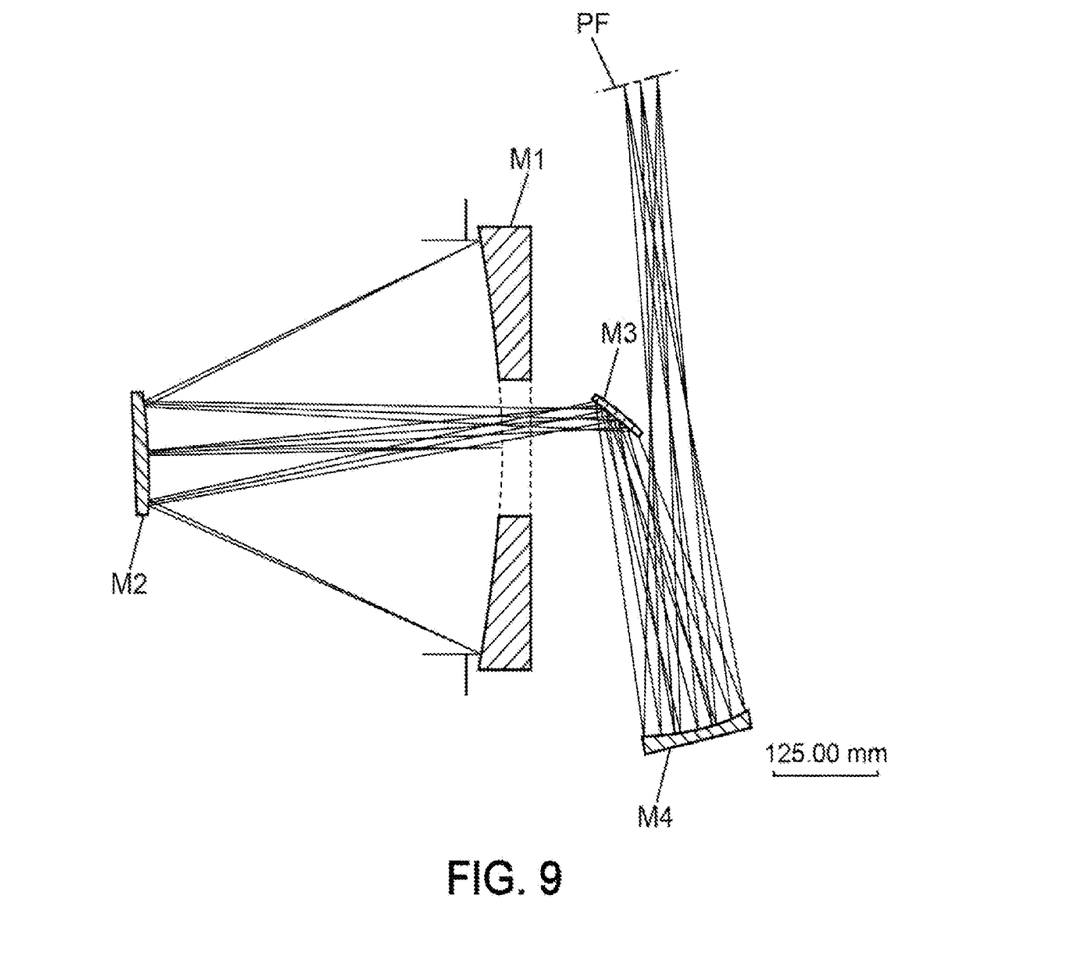
FIG. 9: a representation, to scale, of a section view of a preferred implementation of Korsch optics.

FIG. 9 represents, to scale, a cross-sectional view of an embodiment of Korsch optics, according to a preferred arrangement which allows having particularly compact optics. As shown in FIG. 9, the Korsch optics include a 480 mm mirror M1, a 160 mm mirror M2, a fold mirror M3, and a mirror M4. The incident optical flow is therefore successively reflected by mirror M1, mirror M2 (through mirror M1), the fold mirror M3, and mirror M4, until it reaches the focal plane PF of the observation instrument 20.

With such Korsch optics, an observation instrument of about 80 kg can be designed, carried onboard a satellite of about 300 kg. The focal plane may comprise for example two sensor arrays arranged as described with reference to FIG. 6, spaced apart by 45 mm (d1=45 mm), each sensor array comprising 14,192×10,140 acquisition cells (pixels), for example according to the IMX 411 model marketed by Sony®. For a satellite orbiting at an altitude of 500 km, this allows achieving a resolution of 0.5 m, with a swath of 7 km and a length L of 5 km. The body 11 of the satellite has dimensions of 1.53×1.14×1.0 m. Two solar generators 12, 13 of 1 m² provide power of 250 W, sufficient for the needs of the satellite. Due to this compactness, the inertias $I_{xx}$, $I_{yy}$, $I_{zz}$ along the three axes X, Y, Z of the satellite's frame of reference are low: $(I_{xx}, I_{yy}, I_{zz})=(57, 76, 77)$ kg·m².

The invention claimed is:

1. A method of acquiring images of a terrestrial region Z using a spacecraft in non-geostationary orbit around the Earth along a direction of travel and at a speed of travel relative to the ground $V_{sol}$, said spacecraft comprising an observation instrument associated with a field of view fixed within a frame of reference of the spacecraft and forming a ground footprint of a length L along the direction of travel, and associated with a spatial resolution $R_s$ along the direction of travel, said method comprising:
   a step of observing a portion $P_1$ of a terrestrial region Z, comprising a step of controlling an attitude of the spacecraft during a time interval of a duration α greater than a ratio $R_s/V_{sol}$, the attitude of the spacecraft being controlled such that the ground footprint of the field of view does not move with respect to the ground for the duration α and corresponds to said portion $P_1$, and a step of acquisition by the observation instrument of an image of portion $P_1$ during the time interval of duration α,
   a step of modifying a pitch attitude of the spacecraft so as to orient the field of view such that the ground footprint corresponds to a portion $P_2$ of the terrestrial region Z, the portions $P_1$ and $P_2$ of the terrestrial region Z being contiguous or at most partially overlapping along the direction of travel, and
   a step of observing the portion $P_2$ of the terrestrial region Z,
   wherein the step of modifying the pitch attitude is executed during a time interval of duration β such that a quantity $V_{sol} \cdot (\alpha + R) \cdot 1/L$ is less than 3.

2. The method according to claim 1, further comprising, before the step of observing the portion $P_1$:
   a step of observing a portion $P_0$ of the terrestrial region Z, the portions $P_0$ and $P_1$ being contiguous or at most partially overlapping transversely to the direction of travel, and
   a step of modifying a roll attitude of the spacecraft so as to orient the field of view such that the ground footprint corresponds to the portion $P_1$.

3. The method according to claim 2, further comprising, after the step of observing the portion $P_2$:
   a step of modifying the roll attitude of the spacecraft so as to orient the field of view such that the ground footprint corresponds to a portion $P_3$ of the terrestrial region Z, said portions $P_3$ and $P_2$ being contiguous or at most partially overlapping transversely to the direction of travel, and said portions $P_0$ and $P_3$ being contiguous or at most partially overlapping along the direction of travel, and
   a step of observing $P_3$ of the terrestrial region Z.

4. The method according to claim 1, wherein the duration α is in a range of 200 ms to 1 s.

5. The method according to claim 1, wherein the duration β is in a range of one second to two seconds.

6. The method according to claim 1, further comprising, during each of the steps of observing a portion of the terrestrial region Z, a tranquilization of the attitude of the spacecraft prior to acquisition of the image of the considered portion.

7. The method according to claim 6, wherein the tranquilization duration, comprised within the duration α, is in a range of 100 ms and 800 ms.

8. The method according to claim 1, wherein the terrestrial region Z comprises at least one strip of a length greater than 10 kilometers obtained by the acquisition of images of at least three portions arranged within the extension of one another along the direction of travel of the spacecraft, wherein adjacent portions of the three portions in the direction of travel being contiguous or at most partially overlapping along the direction of travel.

9. A spacecraft configured to be placed in non-geostationary orbit around the Earth in a direction of travel and at a speed of travel relative to the ground $V_{sol}$, said spacecraft having a pitch inertia $I_t$ and comprising:
   an attitude controller having a capacity $C_t$ for formation of pitch torque which corresponds to a maximum value that can take a pitch torque formed by said attitude controller,
   an observation instrument associated with a field of view fixed within a frame of reference of the spacecraft and the field of view having a corresponding ground footprint with a length L along the direction of travel and an associated a spatial resolution $R_s$ along the direction of travel, said observation instrument comprising a number $N_p$ of acquisition cells along the direction of travel of the spacecraft, wherein the number $N_p$ is greater than 1000, and a ratio $C_t/I_t$ is greater than 0.01 s$^{-2}$, and
   a processing circuit configured to control operation of the observation instrument and the attitude controller to:
      observe a portion $P_1$ of the terrestrial region Z of the Earth, wherein the observing of the portion $P_1$ comprises controlling an attitude of the spacecraft during a time interval of a duration α greater than a ratio $R_s/V_{sol}$, such that the ground footprint of the field of view does not move with respect to the ground for the duration α and the ground footprint corresponds to the portion $P_1$, and acquiring by the observation instrument an image of the portion $P_1$ during the time interval of duration $\alpha$, modify a pitch attitude of the spacecraft to orient the field of view such that the ground footprint corresponds to a portion $P_2$ of the terrestrial region Z, wherein the portions $P_1$ and $P_2$ of the terrestrial region Z are contiguous or at most partially overlapping along the direction of travel, and observe the portion $P_2$ of the terrestrial region Z, wherein the modifying the pitch attitude is executed during a time interval of duration $\beta$ such that a quantity $V_{sol} \cdot (\alpha+\beta) \cdot 1/L$ is less than 3.

10. The spacecraft according to claim 9, wherein the capacity $C_t$ is greater than 0.8 N·m.

11. The spacecraft according to claim 9, wherein the attitude controller comprises at least one reaction wheel which recovers electrical energy.

12. The spacecraft according to claim 9, wherein the attitude control means comprises at least one gyroscopic actuator.

13. The spacecraft according to claim 9, wherein the observation instrument comprises at least two sensor arrays arranged transversely to the direction of travel and spaced apart by a non-zero distance (d1) that is less than a width (d2) of at least one of said two sensor arrays measured transversely to the direction of travel.

14. The spacecraft according to claim 9, wherein the observation instrument comprises a Bayer filter.

15. The spacecraft according to claim 9, wherein the observation instrument is configured for successively activating acquisition cells or groups of the acquisition cells during acquisition of an image.

16. A method of acquiring images of a terrestrial region Z using a spacecraft in non-geostationary orbit around the Earth along a direction of travel and at a speed of travel relative to the ground $V_{sol}$ along the direction of travel, said spacecraft includes an observation instrument having a field of view fixed within a frame of reference of the spacecraft and the field of view forms a ground footprint of a length L along the direction of travel, said method comprising:

observing, with the observation instrument, a portion $P_1$ of a terrestrial region Z;

during the observing of the portion $P_1$, controlling an attitude of the spacecraft to hold stationary with respect to the terrestrial region Z the field of view on a first ground footprint covering a portion P1 for a period $\alpha$ which is at least as long as a ratio $R_s/V_{sol}$, where $R_s$ is a spatial resolution Rs along the direction of travel;

after the period $\alpha$, moving a pitch attitude of the spacecraft to reorient the field of view such to a second ground footprint covering a portion $P_2$ of the terrestrial region Z, wherein portion $P_1$ is contiguous with or at most partially overlapping with portion $P_2$ along the direction of travel, and observing, with the observation instrument, the portion $P_2$ of the terrestrial region Z, wherein the moving of the pitch attitude is executed during a time interval of duration $\beta$ such that a quantity $V_{sol} \cdot (\alpha+\beta) \cdot 1/L$ is no greater than 3.

17. The method according to claim 16, wherein the period $\alpha$ is in a range of 200 milliseconds to 1 second.

18. The method according to claim 16, wherein the duration $\beta$ is in a range of one second to two seconds.

19. The method according to claim 16, wherein the terrestrial region Z comprises at least one strip of a length greater than 10 kilometers obtained by acquiring images of at least three portions arranged within the extension of one another along the direction of travel, and wherein adjacent portions of the three portions in the direction of travel are contiguous or at most partially overlapping along the direction of travel.

* * * * *